United States Patent
Li et al.

(10) Patent No.: US 12,273,957 B2
(45) Date of Patent: Apr. 8, 2025

(54) PROFILE AND SUBSCRIPTION MANAGEMENT FOR WIRELESS DEVICES

(71) Applicant: Apple Inc., Cupertino, CA (US)

(72) Inventors: Li Li, Los Altos, CA (US); Dennis D. Conway, Campbell, CA (US); Rajeev Verma, San Jose, CA (US); Keizo Marui, New Dundee (CA)

(73) Assignee: Apple Inc., Cupertino, CA (US)

( * ) Notice: Subject to any disclaimer, the term of this patent is extended or adjusted under 35 U.S.C. 154(b) by 889 days.

(21) Appl. No.: 17/305,858

(22) Filed: Jul. 15, 2021

(65) Prior Publication Data

US 2022/0022028 A1      Jan. 20, 2022

Related U.S. Application Data

(60) Provisional application No. 63/052,434, filed on Jul. 15, 2020.

(51) Int. Cl.
| H04W 8/18 | (2009.01) |
| H04W 4/50 | (2018.01) |
| H04W 4/60 | (2018.01) |

(52) U.S. Cl.
CPC ............. *H04W 8/183* (2013.01); *H04W 4/50* (2018.02); *H04W 4/60* (2018.02)

(58) Field of Classification Search
CPC .......... H04W 8/183; H04W 4/50; H04W 4/60
See application file for complete search history.

(56) References Cited

U.S. PATENT DOCUMENTS

2020/0288298 A1\* 9/2020 Li ........................ H04W 8/183
2020/0389783 A1\* 12/2020 Kang .................... H04W 8/183

\* cited by examiner

*Primary Examiner* — Joseph E Dean, Jr.
(74) *Attorney, Agent, or Firm* — DICKINSON WRIGHT RLLP (57) ABSTRACT

This Application sets forth techniques for profile, e.g., subscriber identity module (SIM) and electronic SIM (eSIM), and cellular wireless service subscription management for a wireless device. The wireless device can support multiple profiles, such as dual SIMS or a single SIM and one or more eSIMs. A user of the wireless device can flexibly enable and disable various eSIMs or change the use of physical SIMs with different associated cellular wireless service subscriptions, and mapping of subscription modules to logical channels and physical hardware interfaces can occur automatically, with mechanisms to reset interfaces when required.

19 Claims, 10 Drawing Sheets

SUBSCRIPTION SELECTION

FIG. 3

SUBSCRIPTION CROSS MAPPING

SUBSCRIPTION STRAIGHT MAPPING

PROFILE AND SUBSCRIPTION MANAGEMENT FOR WIRELESS DEVICES

CROSS-REFERENCE TO RELATED APPLICATIONS

The present application claims the benefit of U.S. Provisional Application No. 63/052,434, entitled "PROFILE AND SUBSCRIPTION MANAGEMENT FOR WIRELESS DEVICES," filed Jul. 15, 2020, the content of which is incorporated by reference herein in its entirety for all purposes.

FIELD

The described embodiments set forth techniques for profile, e.g., subscriber identity module (SIM) and electronic SIM (eSIM), and cellular wireless service subscription management for a wireless device.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

Dual-SIM, Dual-Standby (DSDS) wireless devices today include configurations with two physical SIMs (pSIMs), as well configurations with a single pSIM and one active eSIM on an eUICC of the DSDS wireless device. Recent discussions at standards bodies have included wireless device configurations that include only eSIMs on an eUICC (e.g., no pSIM), as well as wireless device configurations that include multiple active eSIMs on an eUICC (with or without a pSIM). As configurations of SIMs of a wireless device change, management of associated subscriptions and mapping of communication modules within the wireless device is required.

SUMMARY

Representative embodiments set forth techniques for profile, e.g., subscriber identity module (SIM) and electronic SIM (eSIM), and cellular wireless service subscription management for a wireless device. Wireless devices that support multiple profiles, e.g., i) dual SIMS or ii) a single SIM with one or more eSIMs on an eUICC, are becoming more prevalent. Efforts are underway to standardize management of multiple active profiles, particularly multiple active eSIMs, on wireless devices. A user of the wireless device may have the flexibility to enable and disable various eSIMs or switch the use of physical SIMS, each having associated cellular wireless service subscriptions and mobile network operators (MNOs). Providing a consistent interface to the user for different configurations, while also mapping those different configurations to conform to evolving requirements for different MNOs, is challenging. Flexible mapping of cellular wireless service subscription modules to logical channels and physical hardware interfaces are described herein. Logical channels are remapped automatically as configurations of the wireless device change, and error recovery mechanisms account for resetting interfaces for individual profiles (e.g., single eSIMs) rather than resorting to resetting interfaces for all profiles (e.g., all eSIMs on an eUICC). Application protocol data unit (APDU) flow and access to multiple active eSIMs can be realized via abstraction and virtualization mechanisms described herein.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for profile, e.g., subscriber identity module (SIM) and electronic SIM (eSIM), and cellular wireless service subscription management for a wireless device. Wireless devices that support multiple profiles, e.g., i) dual SIMS or ii) a single SIM with one or more eSIMs on an eUICC, are becoming more prevalent. Efforts are underway to standardize management of multiple active profiles, particularly multiple active eSIMs, on wireless devices. A user of the wireless device may have the flexibility to enable and disable various eSIMs or switch the use of physical SIMS, each having associated cellular wireless service subscriptions and mobile network operators (MNOs). Providing a consistent interface to the user for different configurations, while also mapping those different configurations to conform to evolving requirements for different MNOs, is challenging. Flexible mapping of cellular wireless service subscription modules to logical channels and physical hardware interfaces are described herein. Cellular wireless service subscriptions are associated with logical slots that are connected to corresponding physical slots that interface with physical hardware, e.g., pSIMs and/or eSIMs. Different configurations can change associations of logical slots with physical slots, e.g., direct through mapping or cross mapping, to flexibly assign hardware to different cellular wireless service subscriptions. Logical channels are remapped automatically as configurations of the wireless device change, and error recovery mechanisms account for resetting interfaces for individual profiles (e.g., single eSIMs) rather than resorting to resetting interfaces for all profiles (e.g., all eSIMs on an eUICC). Channel mappings can change as pSIMs and/or eSIMs are installed, activated, de-installed, deactivated, and the like. Association of channels for communication between an eUICC and a local profile assistant (LPA) executing on a processor external to the eUICC can be adjusted automatically as eSIMs on the eUICC are enabled, disabled, and/or reset. Individual eSIMs can be reset without impacting other eSIMs on the eUICC. Application protocol data unit (APDU) flow and access to multiple active eSIMs can be realized via abstraction and virtualization mechanisms described herein. In some embodiments, access to multiple active eSIMs can be abstracted by exposing a virtual SIM to upper layers that handle APDU bytes, where the virtual SIM appears as a separate physical SIM to the upper layer clients.

These and other embodiments are discussed below with reference to FIGS. 1-8; however, those skilled in the art will readily appreciate that the detailed description given herein with respect to these figures is for explanatory purposes only and should not be construed as limiting.

Figure 1:
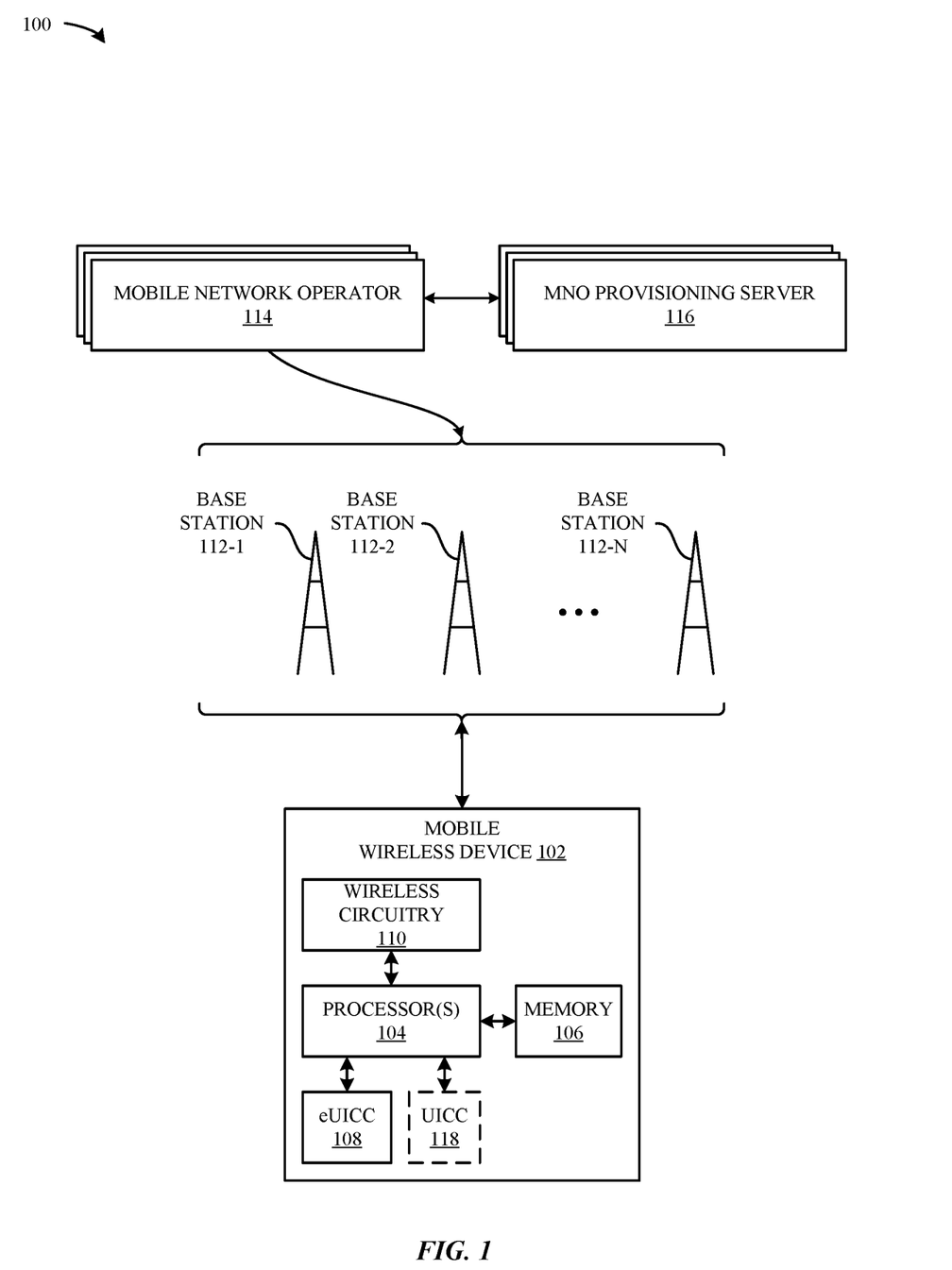
FIG. 1 illustrates a block diagram of different components of an exemplary system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®) or a cellular-capable wearable device (e.g., an Apple Watch), the base stations 112-1 to 112-N can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMS (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO 114, an eSIM is reserved for subsequent download and installation to the eUICC 108. In some embodiments, the eUICC 108 obtains one or more eSIMs from one or more associated provisioning servers 116. The provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

Figure 2:
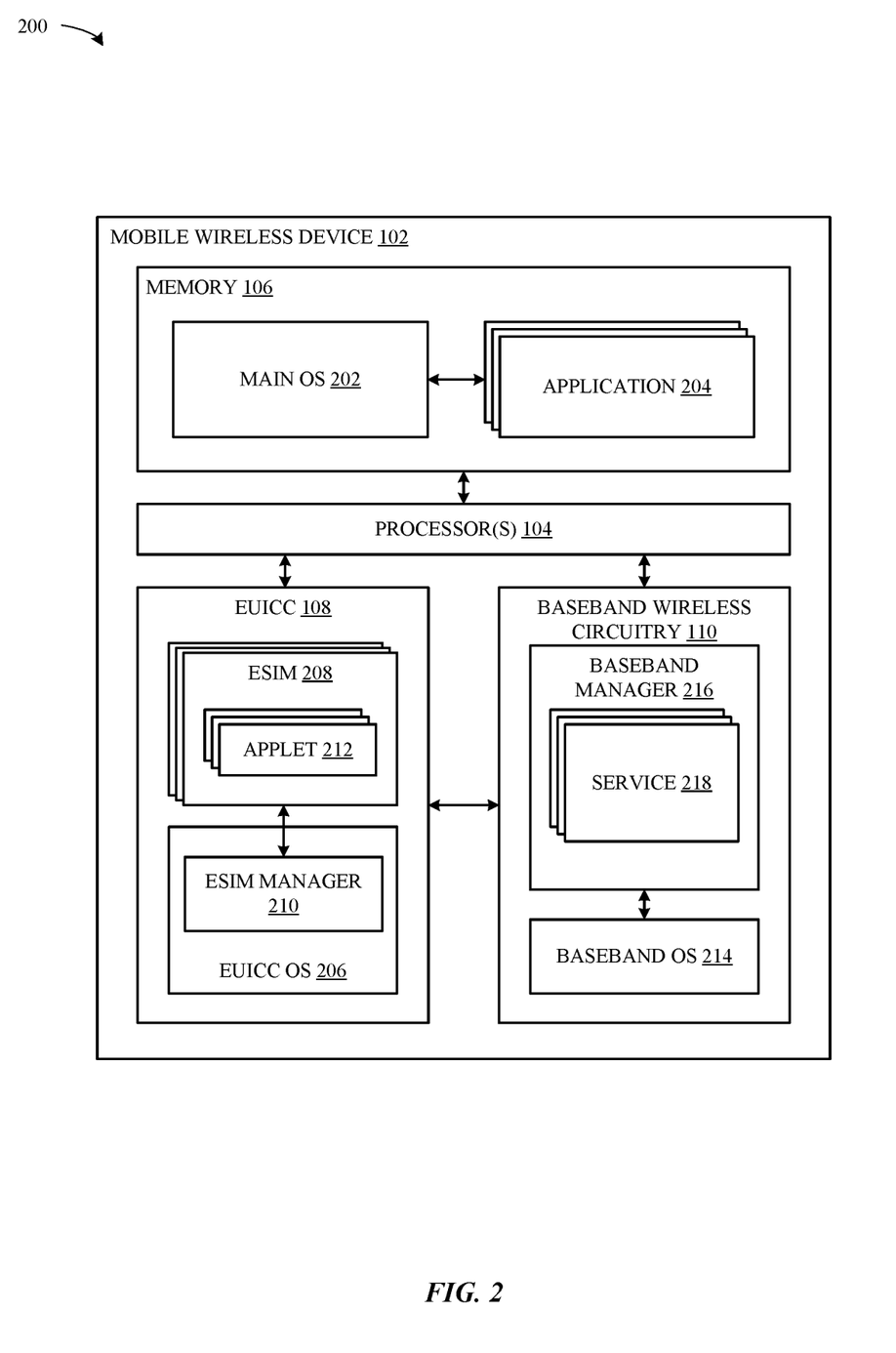
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3:
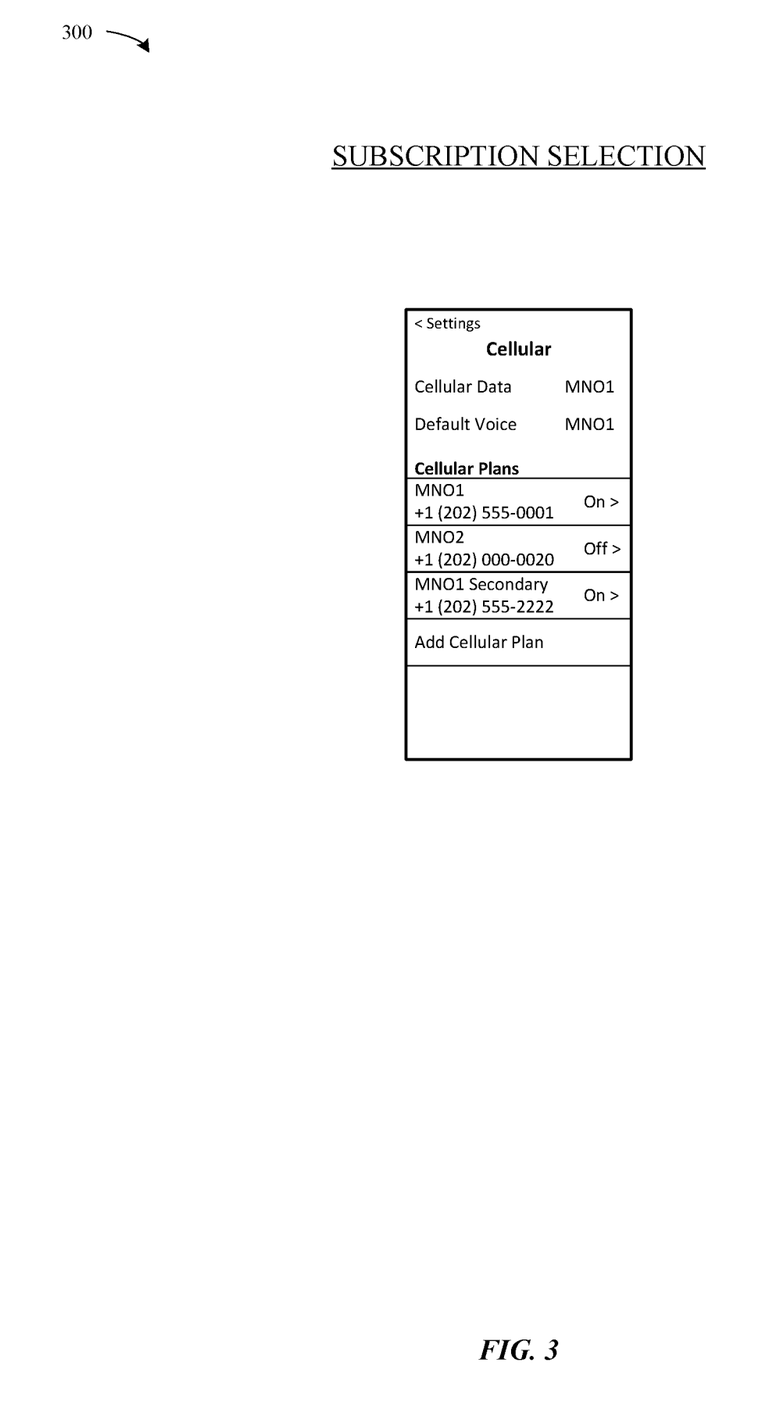
FIG. 3 illustrates an exemplary display screen for cellular wireless service subscription settings for a wireless device, according to some embodiments.

FIG. 3 illustrates an exemplary display screen 300 for cellular wireless service subscription settings for a mobile wireless device 102. A user can subscribe to one or more cellular wireless services provided by one or more MNOs. Access to cellular wireless services can be authorized using credentials included in profiles, e.g., using a SIM on a UICC 118 (physical SIM card) or an eSIM 208 on an eUICC 108, on the mobile wireless device 102. For a mobile wireless device 102 that supports two active profiles at the same time, a user can select a combination of SIMS/eSIMs to be active and use for various functions. Each profile can be listed on the display screen 300 (shown as a list of cellular plans identified by telephone numbers and user-assigned labels). The user can select which profiles are to be used for cellular data and those to be used for default telephony service. When initially setting up a cellular wireless service configuration of the mobile wireless device 102, and when changing the cellular wireless service configuration of the mobile wireless device 102, such as when changing from i) using a physical SIM and an eSIM to ii) using two eSIMs, the user can be presented with options for changing settings, such as for a default telephony (voice) line and for cellular data.

Figure 4:
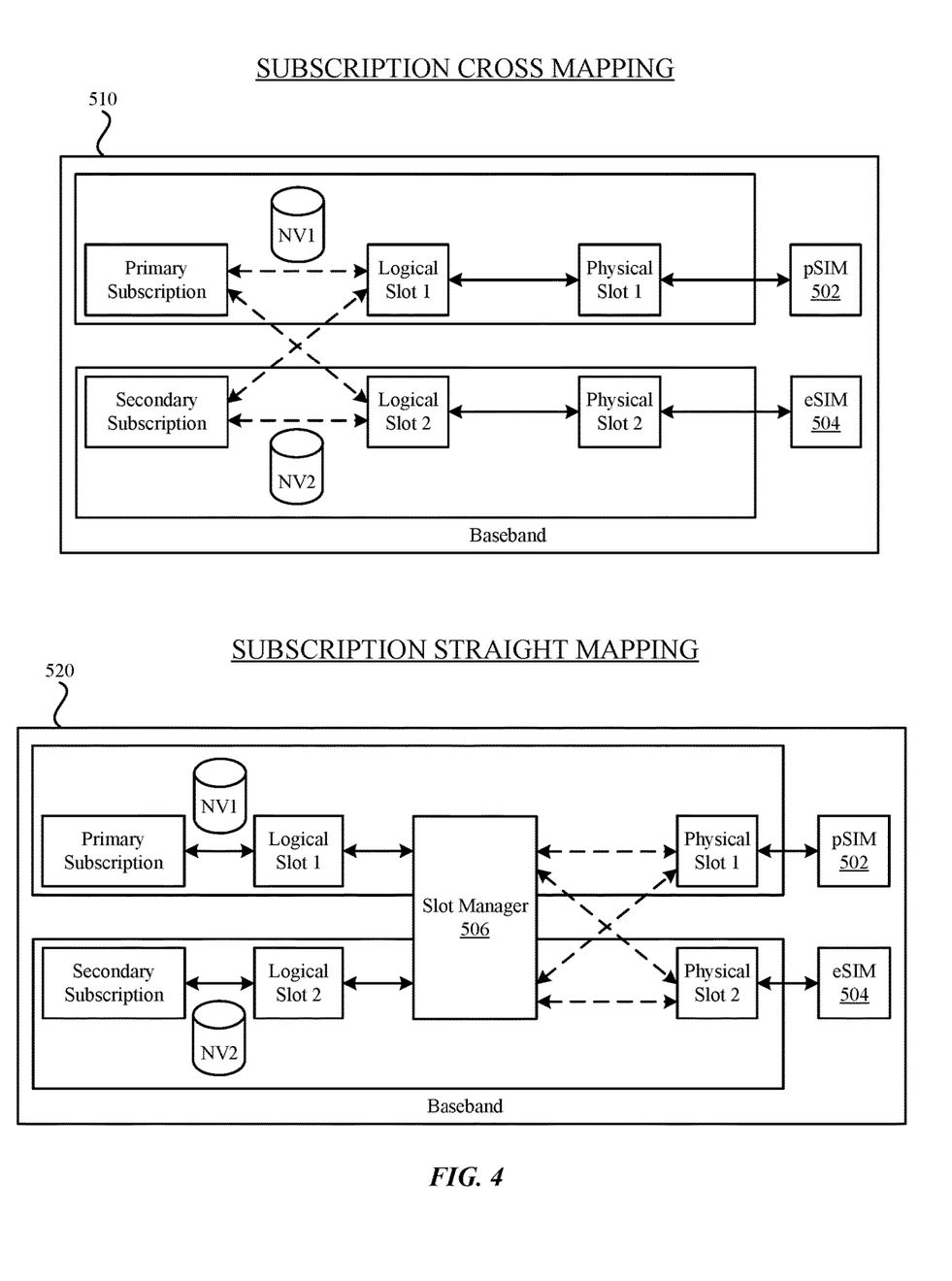
FIG. 4 illustrates block diagrams of exemplary mappings of communication modules for a wireless device, according to some embodiments.

FIG. 4 illustrates a diagram 500 of exemplary mappings 510, 520 of communication modules of a mobile wireless device 102. In some embodiments, a DSDS configuration supports a primary cellular wireless service subscription and a secondary cellular wireless service subscription (primary and secondary being selected by a user of the mobile wireless device 102). In a cross mapping 510 configuration, primary and secondary cellular wireless service subscriptions can be associated with either of two different logical slots, e.g., i) primary subscription mapped to logical slot 1 and secondary subscription mapped to logical slot 2 or ii) primary subscription mapped to logical slot 2 and secondary subscription mapped to logical slot 1. Each logical slot is then connected to a corresponding physical slot that interfaces with the physical hardware that stores the SIMs, e.g., pSIM 502 on a UICC 118 (physical SIM card) and eSIM 504 on an eUICC 108. In a straight mapping 520 configuration the primary and secondary cellular wireless service subscriptions are mapped directly to corresponding logical slots, and the logical slots are configured to map to the physical slots by a slot manager 506. The slot manager 506 can map the logical slots in a through configuration (e.g., logical slot 1 to physical slot 1, logical slot 2 to physical slot 2) or in a cross configuration (e.g., logical slot 1 to physical slot 2, logical slot 2 to physical slot 1). Each logical slot is connected to corresponding physical slots that interface with the physical hardware that store the SIMs, e.g., pSIM 502 on a UICC 118 (physical SIM card) and eSIM 504 on an eUICC 108. Either the cross mapping 510 or the straight mapping 520 provides the flexibility to associate different SIM hardware with different cellular wireless service subscriptions.

Figure 5:
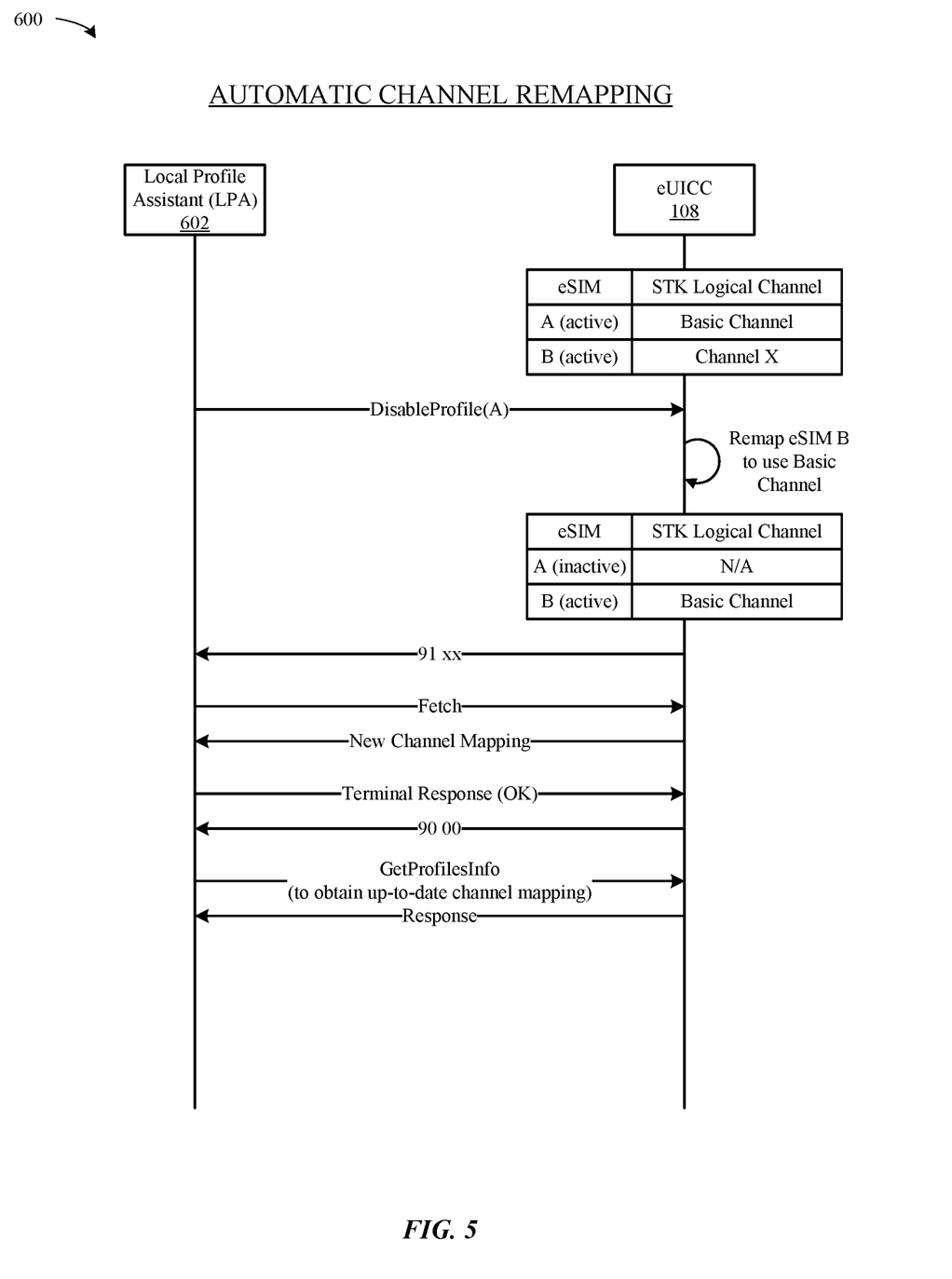
FIG. 5 illustrates a flowchart of an example of automatic channel remapping for a wireless device, according to some embodiments.

FIG. 5 illustrates a flowchart 600 of an example of automatic channel remapping for a mobile wireless device 102. When two eSIMs 208 are enabled on an eUICC 108 at the same time, communication between the eUICC 108 and a local profile assistant (LPA) 602 executing on a processor external to the eUICC 108, e.g., processor 104, can be extended to use both a basic channel and an additional non-basic channel (labeled as channel X) for SIM toolkit (STK) events. Three different communication modes can be considered. In a legacy communication mode, a single eSIM 208 is enabled and STK events are associated with the basic channel (sometimes also referred to as channel 0). The legacy communication mode can be compliant with legacy 3GPP/ETSI specifications for STK event communication. In an extended communication mode, a single eSIM 208 is enabled, and STK events are associated with the non-basic channel. In a DSDS communication mode, two eSIMs 208 are enabled, and STK events for a first eSIM 208 (e.g., eSIM A) use the basic channel, while STK events for a second eSIM 208 (e.g., eSIM B) use the non-basic channel (channel X). Automatic channel remapping, as shown in FIG. 5, allows for switching an STK logical channel for an eSIM 208 when only one eSIM 208 is active and can be mapped to the basic channel for best backward compatibility. Initially, both eSIM A and eSIM B are active, with eSIM A using the basic channel, and eSIM B using the non-basic channel (channel X). The LPA 602 then sends to the eUICC 108 a command to disable eSIM A (e.g., DisableProfile(A) command). The eUICC 108 remaps eSIM B to use the basic channel. Subsequent commands can confirm acceptance of the disable command, and the LPA 602 can retrieve the channel mapping, e.g., using the Fetch command after the DisableProfile command, or later using a GetProfilesInfo command, and the eUICC 108 can provide the updated channel mapping to the LPA 602.

Figure 6A:
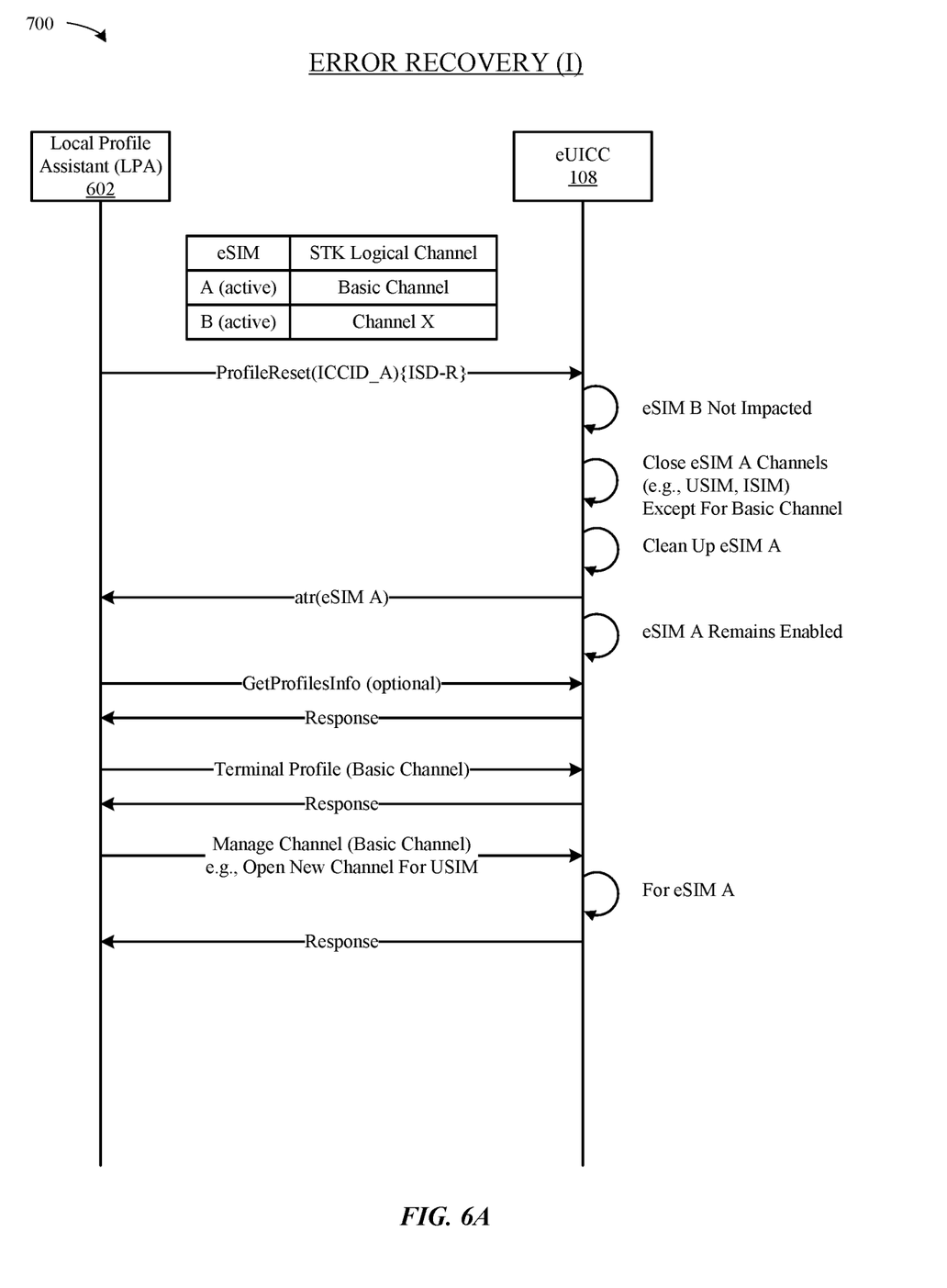
FIGS. 6A and 6B illustrate flowcharts of exemplary error recovery mechanisms for a wireless device, according to some embodiments.
Figure 6B:
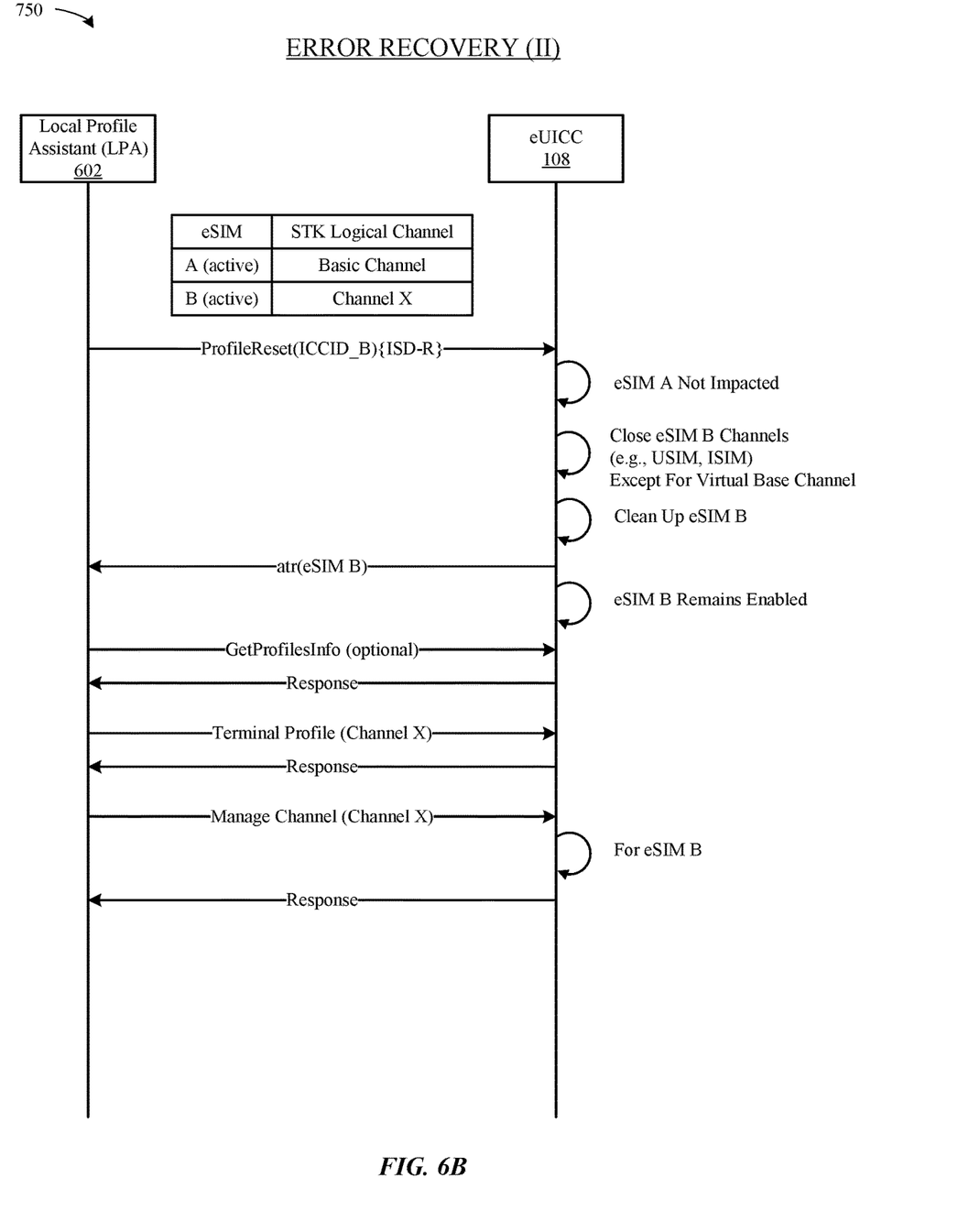

FIGS. 6A and 6B illustrate flowcharts 700, 750 of exemplary error recovery mechanisms for a mobile wireless device 102. When operating with multiple profiles active, e.g., in a DSDS mode with two eSIMs 208 active, one of the eSIMs 208 may require resetting, while the other eSIM 208 may not require adjustment. Instead of resetting the entire communication interface between the LPA 602 and the eUICC 108, which can affect all eSIMs 208 on the eUICC 108, the LPA 602 can reset only the errant eSIM 208. The eUICC 108 can manage error recovery to limit impact on the functional eSIM 208 when resetting the errant eSIM 208. As shown in FIG. 6A, eSIM A can be active and associated with the basic channel, while eSIM B can also be active and associated with the non-basic channel (channel X). The LPA 602 determines that eSIM A must be reset but does not want to reset the interface to the eUICC 108 (to limit affecting eSIM B, which does not require a reset). The LPA 602 sends a command, e.g., ProfileReset(ICCID_A){ISD-R}, which identifies eSIM A by its international integrated circuit card identifier (ICCID) value. The eUICC 108 closes channels used by eSIM A, except for the basic channel, and subsequently performs any needed clean-up operations. eSIM A can remain enabled, and after additional communication with the LPA 602, new channels can be opened for eSIM A. Note that communication for eSIM A can continue to use the basic channel, and eSIM B is not affected by the error recovery operations for eSIM A.

In another error recovery situation, as shown in FIG. 6B, eSIM A can be active and associated with the basic channel, while eSIM B can also be active and can be associated with the non-basic channel (channel X). The LPA 602 determines that eSIM B must be reset but does not want to reset the interface to the eUICC 108 (to limit affecting eSIM A, which does not require a reset). The LPA 602 sends a command, e.g., ProfileReset(ICCID B){ISD-R}, that identifies eSIM B by its ICCID value. The eUICC 108 closes channels used by eSIM B, except for the non-basic, virtual base channel (channel X), and subsequently performs any needed clean-up operations. eSIM B can remain enabled and following additional communication with the LPA 602, new channels can be opened for eSIM B. Note that communication for eSIM B can continue to use the non-basic, virtual base channel (channel X), and eSIM A is not affected by the error recovery operations for eSIM B.

Figure 7A:
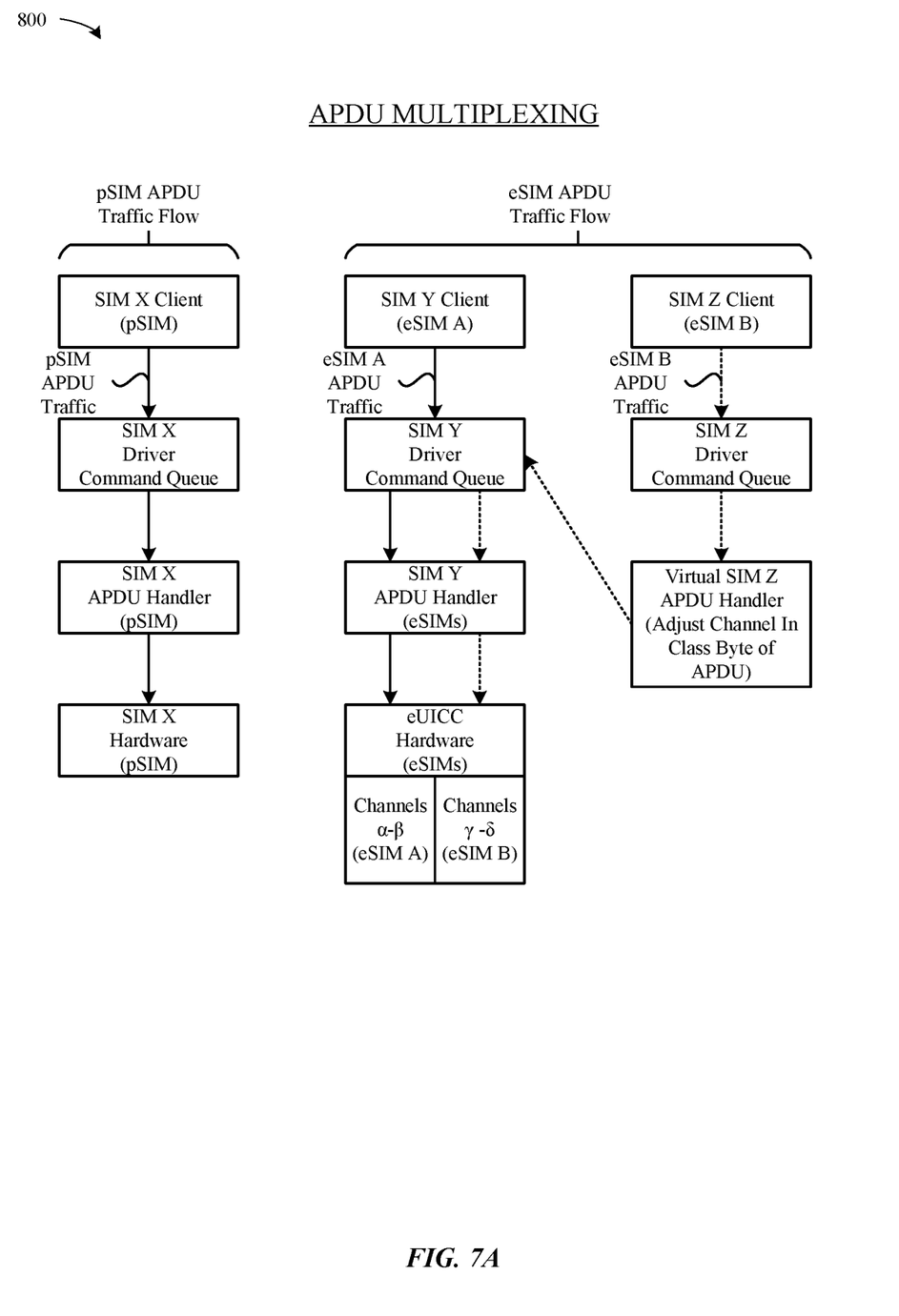
FIG. 7A illustrates a block diagram of an example of application protocol data unit (APDU) multiplexing for a wireless device, according to some embodiments.

FIG. 7A illustrates a block diagram 800 of an example of application protocol data unit (APDU) multiplexing for a mobile wireless device 102 with multiple profiles active at the same time. APDU traffic flow for a physical SIM (eSIM) is shown on the left side of the block diagram 800, with pSIM APDU traffic flowing from a client for SIM X (pSIM) through a SIM X command queue driver and SIM X (eSIM) APDU handler to SIM X(pSIM) hardware. APDU traffic flow for the eSIMs 208 is shown on the center and right side of the block diagram 800, with eSIM B using a virtualized APDU handler to map APDU bytes of SIM Z (eSIM B) into the SIM Y (eSIM A) driver command queue to mix with the eSIM A APDU traffic. A single SIM Y APDU handler manages APDU traffic for both eSIM A and eSIM B, and hardware of the eUICC 108 maps the data to applicable channels. The eUICC 108 hardware can allow for two active eSIM profiles (eSIM A, eSIM B) to be addressed using channel ranges [α-β] and [γ-δ] respectively. Access to multiple active eSIMs 208 is abstracted by exposing a virtual SIM (Z) to upper layers. To the clients, this appears as a separate physical SIM Z. Traffic intended for virtual SIM Z has the channel in its class byte adjusted by the virtual SIM APDU handler. The virtual SIM Z APDU handler routes the APDUs with modified class bytes to the command queue serviced by the SIM Y driver, as though it were another client of SIM Y.

Figure 7B:
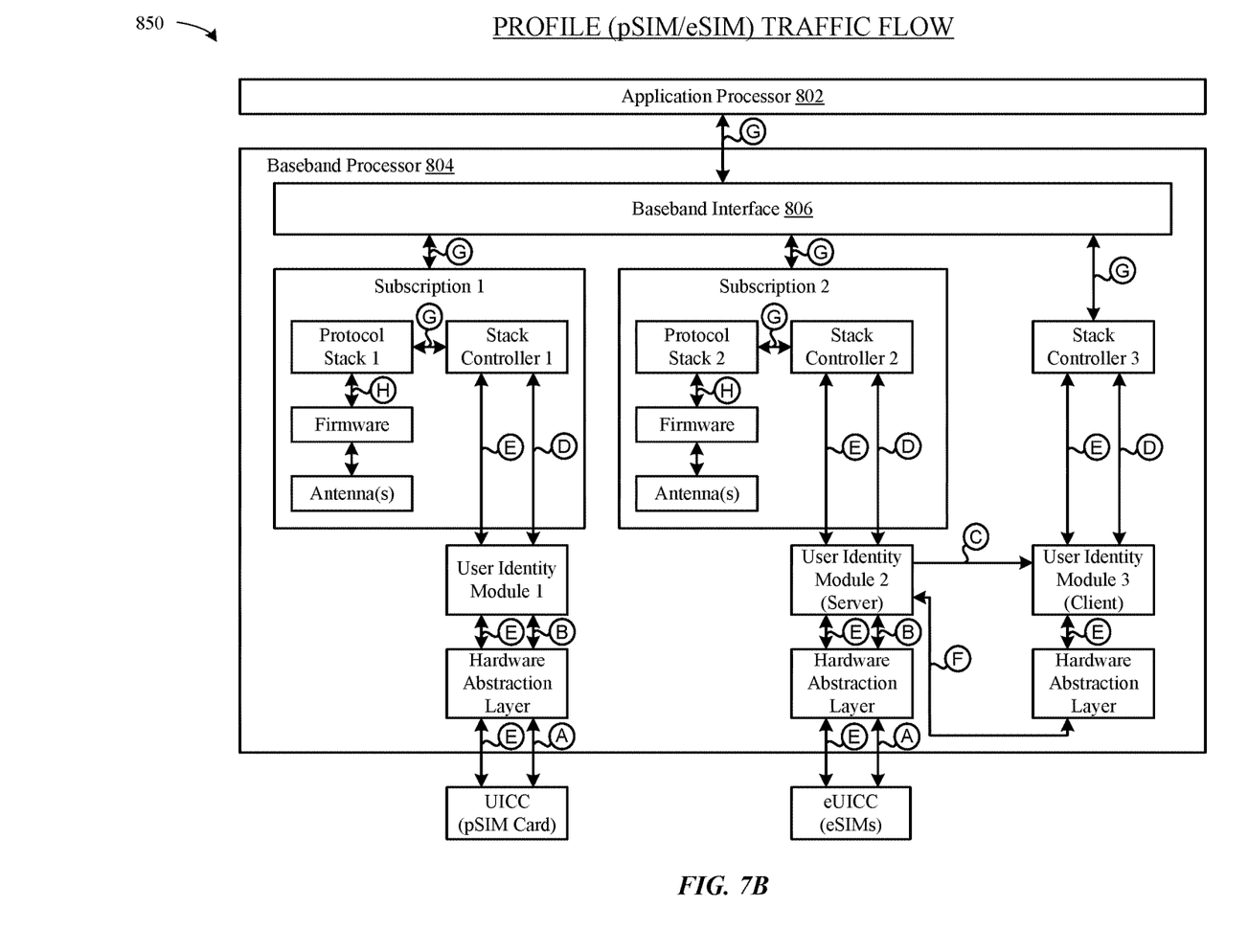
FIG. 7B illustrates a block diagram of an example of profile (pSIM and eSIM) traffic flows for a wireless device, according to some embodiments.

FIG. 7B illustrates a block diagram 850 of an example of profile (pSIM and eSIM) traffic flows for a mobile wireless device 102. At a first step "A", after a baseband processor 804 is powered up, user identity module 1 (UIM1) and user identity module 2 (UIM2)/Server tasks are initialized. These tasks reset the respective SIM hardware, e.g., UICC 118 (pSIM) and eUICC 108 (eSIMs) through their hardware abstraction layers indicated as the actions labeled "A" in FIG. 7B. The user identity module 3 (UIM 3)/Client task is also initialized and waits for further instructions from UIM2 (Server) at first step "A". At a second step "B", UIM1 starts initialization after detecting the UICC 118 (pSIM card), and UIM2 (Server) starts initialization after detecting the eUICC 108. At a third step "C", UIM2 (Server) determines whether the eUICC 108 is configured for a multiple enabled profile (MEP) mode by sending special instructions. If the eUICC 108 is in the MEP mode, UIM2 (Server) informs UIM3 (Client) to start its initialization. If the eUICC 108 is not in the MEP mode, UIM3(Client) is not initialized. At a fourth step "D", a card insertion event is triggered to respective stack interface controllers. At a fifth step "E", SIM initialization procedures progress and complete via respective stack controllers and UIM modules. At a sixth step "F", all SIM traffic between UIM2 (Server) and UIM3(Client) is exchanged via a special mechanism (streaming of SIM commands). At a seventh step "G", a SIM ready event is sent to the respective clients (protocol stack, baseband interface 806 clients, and application processor 802). A user (via an application executing on the application processor 802) selects which two profiles (combination of pSIM and/or eSIMs) to register with their respective cellular wireless networks. At an eighth step "H", corresponding cellular wireless service subscriptions are registered with their respective cellular wireless networks based on the user's selection via the application processor 802. In some embodiments, UIM1 can be attached to stack controller 3 and UIM3 to stack controller 1 (or vice versa) based on a user's selection via the application processor 802.

Representative Embodiments

In some embodiments, an eUICC 108 of a wireless device 102 performs logical channel remapping by at least: i) receiving, from a processor of the wireless device 102 external to the eUICC 108, a command to disable a first eSIM profile 208 that is associated with a basic logical channel; ii) remapping a second eSIM profile 208 from association with a non-basic logical channel to associate with the basic logical channel; and iii) responsive to a query from the processor, providing an updated logical channel mapping to the processor. In some embodiments, prior to disablement of the first eSIM profile 208, the first eSIM profile 208 uses the basic logical channel for SIM toolkit (STK) event communication, and the second eSIM profile 208 uses the non-basic logical channel for STK event communication. In some embodiments, after disablement of the first eSIM profile 208, the second eSIM profile 208 uses the basic logical channel for STK event communication. In some embodiments, prior to disablement of the first eSIM profile 208, the wireless device operates in a dual SIM, dual standby (DSDS) communication mode. In some embodiments, after disablement of the first eSIM profile, the wireless device operates in a legacy communication mode compliant with legacy communication standards for STK event communication. In some embodiments, the query from the processor includes a Fetch command. In some embodiments, the query from the processor includes a GetProfilesInfo command.

In some embodiments, an eUICC 108 of a wireless device 102 performs logical channel management during error recovery by at least: i) receiving, from a processor of the wireless device 102 external to the eUICC 108, a command to reset a first eSIM profile 208 that is associated with a basic logical channel; ii) closing all non-basic logical channels associated with the first eSIM profile 208, while maintaining a basic logical channel associated with the first eSIM profile 208 and at least one non-basic logical channel associated with a second eSIM profile 208; and iii) responsive to a management command from the processor, associating at least one new non-basic logical channel with the first eSIM profile 208. In some embodiments, the second eSIM profile 208 remains active during reset of the first eSIM profile 208. In some embodiments, the eUICC 108 of the wireless device 102 provides an updated logical channel mapping to the processor in response to a query from the processor after reset of the first eSIM profile 208. In some embodiments, the query includes a GetProfilesInfo command. In some embodiments, the query includes a Terminal Profile command directed to the basic logical channel associated with the first eSIM profile 208. In some embodiments, prior to resetting the first eSIM profile 208, the first eSIM profile 208 uses the basic logical channel for STK event communication, and the second eSIM profile 208 uses the at least one non-basic logical channel for STK event communication. In some embodiments, the eUICC 108 of the wireless device 102 further performs actions that include: i) receiving, from the processor of the wireless device 102 external to the eUICC 108, a command to reset the second eSIM profile 208 that is associated with the at least one non-basic logical channel; ii) closing all non-basic logical channels associated with the second eSIM profile 208, while maintaining a virtual base logical channel associated with the second eSIM profile 208 and all logical channels associated with the first eSIM profile 208; and iii) responsive to a management command from the processor, associating at least one new non-basic logical channel with the second eSIM profile 208. In some embodiments, the eUICC 108 of the wireless device 102, provides a second updated logical channel mapping to the processor, in response to a second query from the processor after reset of the second eSIM profile 208. In some embodiments, the second query includes a second GetProfilesInfo command. In some embodiments, the second query includes a Terminal Profile command directed to a logical channel associated with the second eSIM profile 208 used for STK event communication by the second eSIM profile 208.

In some embodiments, a baseband processor of the wireless device 102 manages traffic flows for multiple profiles on a wireless device 102 by at least: i) initializing a first user identity module (UIM) for a physical subscriber identity module (pSIM) and a second UIM for one or more eSIMs 208 of an eUICC 108 of the wireless device 102; ii) determining, by the second UIM whether the eUICC 108 supports a multiple enabled profile (MEP) mode; and iii) when the eUICC 108 supports the MEP mode: a) initializing a third UIM, and b) registering two profiles with respective cellular wireless networks, where the first UIM interfaces between the pSIM and a first protocol stack controller for a first wireless subscription, and the second UIM interfaces between the one or more eSIMs 208 of the eUICC 108 and a second protocol stack controller for a second wireless subscription. In some embodiments, the second UIM performs a server function and the third UIM performs a client function. In some embodiments, when the eUICC 108 does not support the MEP mode, the two profiles are registered with their respective cellular wireless networks without initializing the third UIM.

Representative Device

Figure 8:
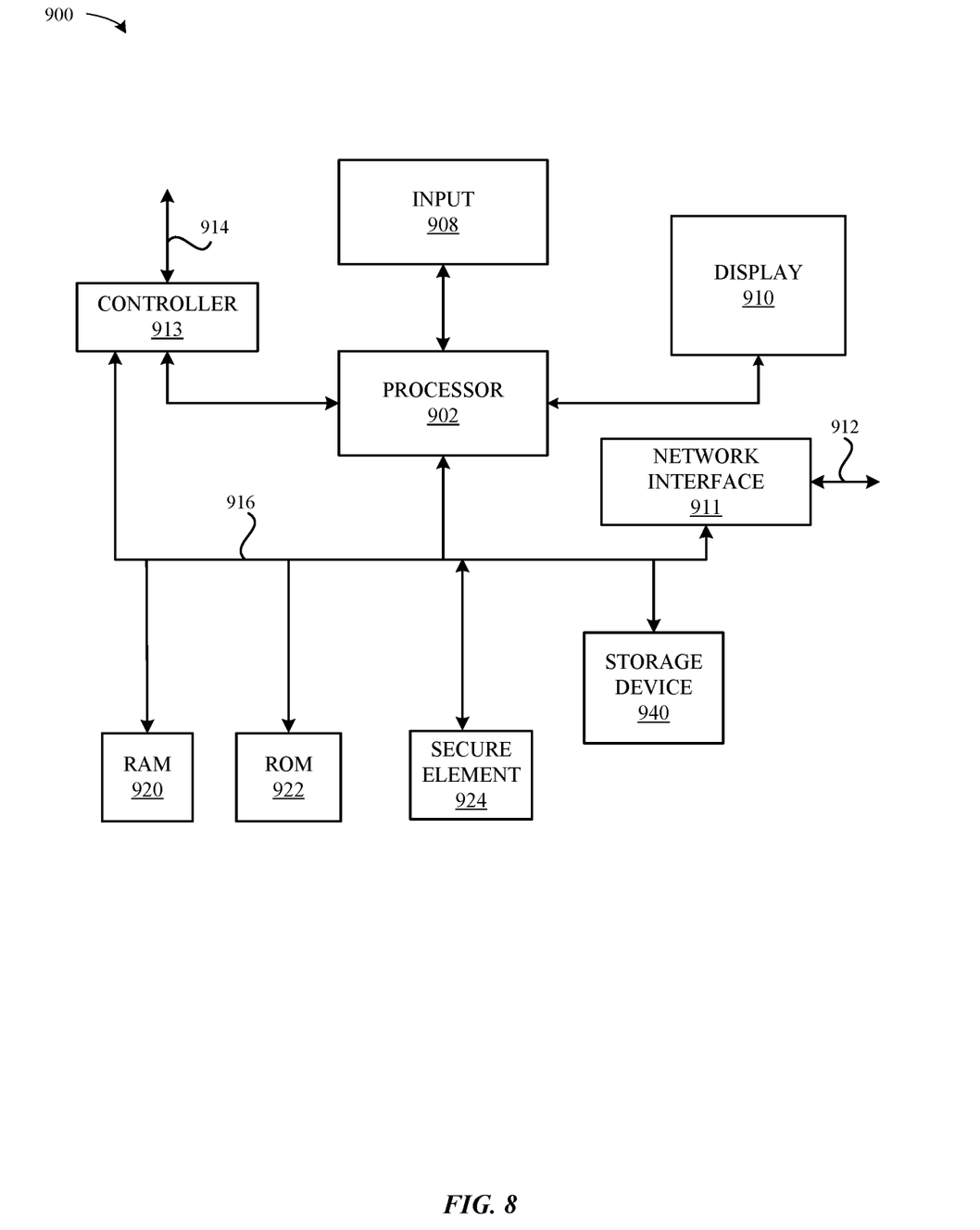
FIG. 8 illustrates a block diagram of exemplary elements of a mobile wireless device, according to some embodiments.

FIG. 8 illustrates a detailed view of a representative computing device 900 that can be used to implement various methods described herein, according to some embodiments. In particular, the detailed view illustrates various components that can be included in the mobile wireless device 102. As shown in FIG. 8, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 that can be controlled by the processor 902 to display information to the user. A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that communicatively couples to a data link 912. In the case of a wireless connection, the network/bus interface 911 can include a wireless transceiver.

The computing device 900 also includes a storage device 940, which can comprise a single disk or a plurality of disks (e.g., hard drives), and includes a storage management module that manages one or more partitions within the storage device 940. In some embodiments, storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900. The computing device 900 further includes a secure element 924, which can include an eUICC 108 on which to store one or more eSIMs 208 and/or a UICC 118 (physical SIM card).

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for logical channel remapping by a wireless device, the method comprising:
   by an embedded universal integrated circuit card (eUICC) of the wireless device:
      receiving, from a processor of the wireless device external to the eUICC while in a dual SIM, dual standby (DSDS) communication mode with both a first electronic subscriber identity module (eSIM) profile and a second eSIM profile in an active state, a command to disable the first eSIM profile that is associated with a basic logical channel;
      responsive to receipt of the command to disable the first eSIM profile while the second eSIM profile is in the active state, automatically remapping the second eSIM profile from association with a non-basic logical channel to associate with the basic logical channel; and
      responsive to a query from the processor, providing an updated logical channel mapping to the processor.

2. The method of claim 1, wherein prior to disablement of the first eSIM profile:
   the first eSIM profile uses the basic logical channel for SIM toolkit (STK) event communication; and
   the second eSIM profile uses the non-basic logical channel for STK event communication.

3. The method of claim 2, wherein after disablement of the first eSIM profile, the second eSIM profile uses the basic logical channel for STK event communication.

4. The method of claim 1, wherein after disablement of the first eSIM profile, the wireless device operates in a legacy communication mode compliant with legacy communication standards for STK event communication.

5. The method of claim 1, wherein the query from the processor comprises a Fetch command.

6. The method of claim 1, wherein the query from the processor comprises a GetProfilesInfo command.

7. A method for logical channel management during error recovery by a wireless device, the method comprising:
   by an embedded universal integrated circuit card (eUICC) of the wireless device while in a dual SIM, dual standby (DSDS) communication mode with both a first electronic subscriber identity module (eSIM) profile and a second eSIM profile in an active state:

receiving, from a processor of the wireless device external to the eUICC, a profile reset command to reset the first eSIM profile that is associated with a basic logical channel;

responsive to receipt of the profile reset command, closing all non-basic logical channels associated with the first eSIM profile, while maintaining a basic logical channel associated with the first eSIM profile and at least one non-basic logical channel associated with the second eSIM profile; and responsive to a management command from the processor, associating at least one new non-basic logical channel with the first eSIM profile.

8. The method of claim 7, wherein the second eSIM profile remains active during reset of the first eSIM profile.

9. The method of claim 7, further comprising:
by the eUICC of the wireless device:
responsive to a query from the processor after reset of the first eSIM profile, providing an updated logical channel mapping to the processor.

10. The method of claim 9, wherein the query comprises a GetProfilesInfo command.

11. The method of claim 9, wherein the query comprises a Terminal Profile command directed to the basic logical channel associated with the first eSIM profile.

12. The method of claim 7, wherein prior to resetting the first eSIM profile:
the first eSIM profile uses the basic logical channel for SIM toolkit (STK) event communication; and
the second eSIM profile uses the at least one non-basic logical channel for STK event communication.

13. The method of claim 12, further comprising:
by the eUICC of the wireless device while in the DSDS communication mode with both the first eSIM profile and the second eSIM profile in an active state:
receiving, from the processor of the wireless device external to the eUICC, a command to reset the second eSIM profile that is associated with the at least one non-basic logical channel;
closing all non-basic logical channels associated with the second eSIM profile, while maintaining a virtual base logical channel associated with the second eSIM profile and all logical channels associated with the first eSIM profile; and
responsive to a management command from the processor, associating at least one new non-basic logical channel with the second eSIM profile.

14. The method of claim 13, further comprising:
by the eUICC of the wireless device:
responsive to a second query from the processor after reset of the second eSIM profile, providing a second updated logical channel mapping to the processor.

15. The method of claim 14, wherein the second query comprises a second GetProfilesInfo command.

16. The method of claim 14, wherein the second query comprises a Terminal Profile command directed to a logical channel associated with the second eSIM profile used for STK event communication by the second eSIM profile.

17. A method for managing traffic flows for multiple profiles on a wireless device, the method comprising:
by a baseband processor of the wireless device:
initializing a first user identity module (UIM) for a physical subscriber identity module (pSIM) and a second UIM for one or more electronic SIMs (eSIMs) of an embedded universal integrated circuit card (eUICC) of the wireless device;
determining, by the second UIM whether the eUICC supports a multiple enabled profile (MEP) mode; and
when the eUICC supports the MEP mode:
initializing a third UIM; and
registering two profiles with respective cellular wireless networks,
wherein:
the first UIM interfaces between the pSIM and a first protocol stack controller for a first wireless subscription, and
the second UIM interfaces between the one or more eSIMs of the eUICC and a second protocol stack controller for a second wireless subscription.

18. The method of claim 17, wherein the second UIM performs a server function and the third UIM performs a client function.

19. The method of claim 18, wherein when the eUICC does not support the MEP mode, the two profiles are registered with their respective cellular wireless networks without initializing the third UIM.

* * * * *

UNITED STATES PATENT AND TRADEMARK OFFICE
CERTIFICATE OF CORRECTION

PATENT NO. : 12,273,957 B2
APPLICATION NO. : 17/305858
DATED : April 8, 2025
INVENTOR(S) : Li Li et al.

It is certified that error appears in the above-identified patent and that said Letters Patent is hereby corrected as shown below:

On the Title Page

In item (57) the Abstract section in the 5th Line: "multiple profiles, such as dual SIMS or a single SIM and one" should read -- multiple profiles, such as dual SIMs or a single SIM and one --.

In the Specification

At Column 1, Line 67: "multiple profiles, e.g., i) dual SIMS or ii) a single SIM with" should read -- multiple profiles, e.g., i) dual SIMs or ii) a single SIM with --.

At Column 3, Line 35: "multiple profiles, e.g., i) dual SIMS or ii) a single SIM with" should read -- multiple profiles, e.g., i) dual SIMs or ii) a single SIM with --.

At Column 3, Line 41: "or switch the use of physical SIMS, each having associated" should read -- or switch the use of physical SIMs, each having associated --.

At Column 4, Line 58: "store multiple electronic SIMS (eSIMs) for accessing" should read -- store multiple electronic SIMs (eSIMs) for accessing --.

At Column 5, Line 67: "a user can select a combination of SIMS/eSIMs to be active" should read -- a user can select a combination of SIMs/eSIMs to be active --.

At Column 7, Line 59: "the same time. APDU traffic flow for a physical SIM (eSIM)" should read -- the same time. APDU traffic flow for a physical SIM (pSIM) --.

At Column 7, Lines 62-63: "through a SIM X command queue driver and SIM X (eSIM) APDU handler to SIM X (pSIM) hardware, APDU traffic" should read -- through a SIM X command queue driver and SIM X (pSIM) APDU handler to SIM X(pSIM) hardware. APDU traffic --.

Signed and Sealed this
Sixteenth Day of December, 2025

John A. Squires
*Director of the United States Patent and Trademark Office*